United States Patent Office 3,574,799
Patented Apr. 13, 1971

3,574,799
THIAZOLYLPENICILLINS AND THEIR PREPARATION
Peter Bamberg, Enhorna, and Berndt Olof Harald Sjoberg, Sodertalje, Sweden, assignors to Aktiebolaget Astra, Sodertalje, Sweden
No Drawing. Filed Mar. 18, 1968, Ser. No. 714,000
Claims priority, application Great Britain, Mar. 20, 1967, 12,880/67
Int. Cl. C07d 99/16
U.S. Cl. 260—239.1        7 Claims

ABSTRACT OF THE DISCLOSURE

A new class of penicillins is disclosed, which penicillins contain a thiazolyl, a thiazolylmethyl or a substituted thiazolylmethyl group in the side chain. Method of synthesis and evaluations of anti-bacterial activity are described.

---

The present invention relates to thiazolylpenicillins and their preparation. Particularly, it concerns penicillins containing thiaozlyl, a thiazolylmethyl or a substituted thiazolylmethyl group in the side chain. The compounds prepared according to the present invention are of value as antibacterial agents, as nutritional supplements in animal feeds as agents for treatment of mastitis in cattle and as therapeutic agents in poultry and animals, including man, in the treatment of infectious diseases caused by microorganisms.

Accordingly the present invention provides compounds of the general formula $$R-CO-NH-CH-CH \overset{S}{\underset{CO-N}{\diagdown}} \overset{CH_3}{\underset{CH-COOH}{\diagup}} C-CH_3 \quad (I)$$

wherein R is thiazolyl or the group $$R^1-CH-\underset{R^2}{|}$$

where $R^1$ is hydrogen, lower alkyl, lower alkenyl, lower alkinyl or monocarbocyclic aryl containing 6 to 10 carbon atoms and $R^2$ is a thiazolyl group which is unsubstituted or substituted with at least one member of the class consisting of lower alkyl, monocarbocyclic aryl of 6 to 10 carbons, monocarbocyclic heterocycle, aralkyl of at most 10 carbon atoms, halogen, hydroxy, lower alkoxy, monocarbocyclic aryloxy of 6 to 10 carbon atoms, lower alkanoyloxy, monocarbocyclic aroyloxy of 6 to 10 carbon atoms, amino and amino substituted with lower alkyl, monocarbocyclic aryl of 6 to 10 carbon atoms or aralkyloxycarbonyl of at most 10 carbon atoms, the term "lower" meaning containing up to 6 carbon atoms, and $R^2$ when bound in position 4 being substituted with substituents others than lower alkyl.

Illustrative examples of compounds according to the invention are:

6-(4-thiazolylcarboxamido)penicillanic acid.
6-[α-(thiazole-5)acetamido]penicillanic acid.
6-[α-(4-methylthiazole-5)acetamido]penicillanic acid,
  6-[α-(4-methylthiazole-2)acetamido]penicillanic acid.
6-[α-(4-phenylthiazole-5)acetamido]penicillanic acid,
  6-[α-(2-phenylthiazole-5)acetamido]penicillanic acid,
  6-[α-(2-o-tolylthiazole-4)acetamido]penicillanic acid,
  6-[α-(2-o-tolylthiazole-5)acetamido]penicillanic acid,
6-[α-(2-m-tolylthiazole-5)acetamido]penicillanic acid,
  6-[α-(2-o-chlorophenylthiazole-5)acetamido]penicillanic acid.
6-[α-(2-β-pyridylthiazole-4)acetamido]penicillanic acid.
6-[α-(2-chlorothiazole-4)acetamido]penicillanic acid,
6-[α-(2-chlorothiazole-5)acetamido]penicillanic acid.
6-[α-(2-benzyloxycarbonylaminothiazole-4)acetamido]penicillanic acid.
6-[α-(2-phenyl-4-methylthiazole-5)acetamido]penicillanic acid, 6-[α-(2-chloro-4-methylthiazole-5)acetamido]penicillanic acid, 6-[α-(2-chloro-4-phenyl-5)acetamido]penicillanic acid, 6-[α-(2,4-diphenylthiazole-5)-acetamido]penicillanic acid,6-[α-(2-o-chlorophenyl-4-phenylthiazole-5)-acetamido]penicillanic acid, 6-[α-(2-o-tolyl-4-phenylthiazole-5)acetamido]penicillanic acid, 6-[α-(2-m-tolyl-4-phenylthiazole-5)acetamido]penicillanic acid.

The invention also comprises non-toxic salts of compounds of the Formula I. The salts include non-toxic metallic salts as sodium, potassium, calcium and aluminium salts, ammonium salts and substituted ammonium salts, e.g. salts of such nontoxic amines as trialkylamines, including triethylamine, procaine, dibenzylamine, N-benzyl-β-phenethylamine, 1-ephenamine, N,N'-dibenzylethylenediamine, dihydroabiethylamine, N,N'-bisdehydroabietylethylenediamine, and other amines, which have been used to form salts with benzylpenicillin or phenoxymethylpenicillin.

The present invention further provides a process for the preparation of compounds of the general Formula I, which process comprises reacting a compound of the general formula $$R-COX \quad (II)$$

with 6-aminopenicillanic acid or a salt of it in organic or aqueous organic solutions or with a derivative of 6-aminopenicillanic acid of the general formula $$Y-NH-CH-\overset{S}{\underset{CH}{\diagdown}} \overset{CH_3}{\underset{CO-N-CH-COOR^3}{\diagup}} C-CH_3 \quad (III)$$

in organic solutions, where R has the same meaning as above, $R^3$ represents trialkylsilyl, a phenacyl group which may be unsubstituted or substituted with one or more halogen atoms, lower alkyl, lower alkoxy or nitro groups or $R^3$ represents $$-Sn\overset{R^4}{\underset{R}{\diagdown}}R$$

wherein $R^4$, $R^5$ and $R^6$ may be the same or different and each represents a monovalent hydrocarbon group, for example an alkyl, aryl or aralkyl group; CO—X and Y—NH are groups of atoms capable of reacting with each other with formation of a carbon-nitrogen bond, so that, if necessary or desired after hydrolysis, a —CO—NH-group is obtained. Particularly Y is hydrogen or at the same time as $R^3$ is a trialkylsilyl group.

The compound of the general Formula II may be an acid chloride or its functional equivalent such as an acid azide, an acid bromide, an activated ester, an anhydride, a mixed anhydride, especially one formed with an alkoxy formic acid or a derivative obtained by reaction between a carboxylic acid and a carbodiimide or other compounds functioning in the same way, such as N,N'-carbonyldiimidazole, N-ethyl-5-phenylisoxazolium-3'-sulphonate or N-tert.-butyl-5-methylisoxazolium perchlorate.

The reaction is desirably carried out in an organic solvent such as tetrahydrofuran, dimethylformamide, acetonitrile or mixtures thereof, and at room temperature or below, preferably between —5 and +5° C. In order to obtain complete acylation of the 6-aminopenicillanic esters (III) an excess of the acylating agent may be used and the acylation product can be freed from excess of acylating agent by treatment at pH 7 with water. After purification of the acylation product the ester linkage may readily be cleaved by simple procedures without any appreciable destruction of the penicillin molecule taking place. Cleavage can be brought about by treatment with certain basic or nucleophilic agents in aqueous or non-aqueous solution. In non-aqueous media the penicillin may be obtained directly in crystalline form e.g. as the sodium or potassium salt. The ester group can also be removed by treatment with acid under mild conditions.

Certain of the penicillins defined in Formula I with $R^1=H$ may be prepared by fermentation or enzymatic coupling. If the compounds of the general Formula II contain one or more asymmetric centres the resulting compounds of the general Formula I may exist in different diastereoisomeric forms, which all are biologically active. It is to be understood that the present invention comprises the diastereoisomers as well as mixtures of them.

The following examples illustrate the invention:

EXAMPLE 1

6[α-(4-methylthiazole-5)acetamido]penicillanic acid

To a stirred ice cold mixture of 4-methyl-thiazole-5-acetic acid (1.2 g.) and tributyltin-6-aminopenicillinate (2.65 g.) in tetrahydrofuran (10 ml.) was added N,N'-dicyclohexylcarbodiimide (1.1 g.) in tetrahydrofuran (5 ml.). After stirring at 4° C. for 15–20 hours ethyl acetate (50 ml.) was added. The dicyclohexylurea (about 1.1 g.) was removed by filtration, water (30 ml.) was added and the pH adjusted to 6.8. The aqueous layer was discarded and the organic phase was dried and the solvent removed in vacuo to yield an oily residue (2.95 g.) which was dissolved in dimethylformamide (3 ml.) and treated with potassium thiophenolate (0.69 g.) in dimethylformamide (2 ml.) for 30 min. at 25° C. Ether (100–150 ml.) was added and the precipitated potassium salt of 4-thiazolylmethylpenicillin was collected by filtration. Purity 70%, IR-absorption 1760 cm.$^{-1}$. Minimum inhibitory concentration (MIC) against *Staphylococcus aureus*, Oxford 0.13 mcg./ml. and against *Streptococcus pyogenes* 0.01 mcg./ml.

In a similar way the following penicillins were prepared starting with the corresponding thiazolylacetic acids:

6-[α-(thiazole-5)acetamido]penicillanic acid, purity 77%, IR-absorption: 1765 cm.$^{-1}$, MIC against *Staph. aureus*, Oxford 0.13 mcg./ml., against *Streptoc. pyogenes* 0.01 mcg./ml. and against *E. coli* 625 mcg./ml.

6 - [α-(2-phenyl-4-methylthiazole-)acetamido]penicillanic acid, purity 91%, IR-absorption at 1760 cm.$^{-1}$, MIC against *Staph. aureus*, Oxford 0.03 mcg./ml. and against *Streptoc. pyogenes* ≤0.006 mcg./ml.

6-[α-(2-o-chlorophenyl - 4 - methylthiazole-5)acetamido] penicillanic acid, purity 92%, IR-absorption at 1760 cm.$^{-1}$, MIC against *Staph. aureus*, Oxford 0.03 mcg./ml. and against *Streptoc. pyogenes* ≤0.006 mcg./ml.

6-[α-(2 - chlorothiazole - 4)acetamido]penicillanic acid, purity 99%, IR-absorption at 1755 cm.$^{-1}$, MIC against *Staph. aureus*, Oxford 0.03 mcg./ml. and against *Streptoc. pyogenes* ≤0.006 mcg./ml.

6-[α-(2 - o-tolylthiazole - 4)acetamido]penicillanic acid, purity 100%, IR-absorption 1765 cm.$^{-1}$, MIC against *Staph. aureus*, Oxford 0.06 mcg./ml. and against *Streptoc. pyogenes* ≤0.006 mcg./ml.

6-[α-(2 - m-tolylthiazole - 4)acetamido]penicillanic acid, purity 93.5%, IR-absorption 1765 cm.$^{-1}$, MIC against *Staph. aureus*, Oxford 0.06 mcg./ml. and against *Streptoc. pyogenes* 0.01 mcg./ml.

6-[α-(2 - p - tolylthiazole-4)acetamido]penicillanic acid, purity 100%, IR-absorption 1755 cm.$^{-1}$, MIC against *Staph. aureus*, Oxford 0.06 mcg./ml. and against *Streptoc. pyogenes* 0.01 mcg./ml.

6-[α-(2-o-chlorophenylthiazole - 4)acetamido]penicillanic acid, purity 89%, IR-absorption 1760 cm.$^{-1}$, MIC against *Staph. aureus*, Oxford 0.03 mcg./ml. and against *Streptoc. pyogenes* ≤0.006 mcg./ml.

6-[α-(2 - m-chlorophenylthiazole - 4)acetamido]penicillanic acid, purity 81%, IR-absorption 1760 cm.$^{-1}$, MIC against *Staph. aureus*, Oxford 0.03 mcg./ml. and against *Streptoc. pyogenes* ≤0.006 mcg./ml.

6-[α-(2-p-chlorophenylthiazole - 4)acetamido]penicillanic acid, purity 76%, IR-absorption 1760 cm.$^{-1}$, MIC against *Staph. aureus*, Oxford 0.06 mcg./ml. and against *Streptoc. pyogenes* ≤0.006 mcg./ml.

6-[α-(4 - methylthiazole - 2)acetamido]penicillanic acid, purity 92%, IR-absorption 1760 cm.$^{-1}$, MIC against *Staph. aureus*, Oxford 0.06 mcg./ml. and against *Streptoc. pyogenes* 0.01 mcg./ml.

6-[α-(2-benzyloxycarbonylaminothiazole - 4)acetamido] penicillanic acid, purity 74%, IR-absorption 1750 cm.$^{-1}$, MIC against *Staph. aureus*, Oxford 0.13 mcg./ml. and against *Streptoc. pyogenes* 0.01 mcg./ml.

6-[α-(2-benzoyloxycarbonylamino - 4 - phenylthiazole-5) acetamido]penicillanic acid, purity 59%, IR-absorption 1745 cm.$^{-1}$, MIC against *Staph. aureus*, Oxford 0.03 mcg./ml. and against *Streptoc. pyogenes* 0.01 mcg./ml.

6 - [α-(2-β-pyridylthiazole-4)acetamido]penicillanic acid, purity 85%, IR-absorption 1760 cm.$^{-1}$.

EXAMPLE 2

6-[α-(4-phenylthiazole-5)acetamido]penicillanic acid

To a stirred ice cooled mixture of p-bromophenacyl-6-aminopenicillanate benzenesulponic acid salt (5.71 g., 0.01 mole) and 4-phenylthiazole-5-acetic acid (2.63 g., 0.012 mole) in dimethylformamide (25 ml.) N,N'-dicyclohexylcarbodiimide (2.26 g., 0.011 mole) in dimethylformamide (10 ml.) was added dropwise. After 15 hours at +4° C. the mixture was poured into ice water and ethyl acetate and filtered, the water phase was extracted once more with ethyl acetate, the combined organic phases was washed with 2 N sodium bicarbonate and brine, dried and evaporated. The oily residue (7.8 g.) was dissolved in dimethylformamide (15 ml.) and potassium thiophenoxide (1.48 g., 0.01 mole) was added. After 30 min. at 20–25° C. the solution was poured into 200 ml. of acetone/ether 1:1. The precipitated product was collected by filtration. IR-absorption at 1765 cm.$^{-1}$ (β-lactam C=O), purity 95%, minimum inhibitory concentration (MIC) against *Staph. aureus*, Oxford 0.03 mcg./ml., and against *Streptoc. pyogenes* ≤0.006 mcg./ml.

EXAMPLE 3

6-[α-(2-phenylthiazole-4)acetamido]penicillanic acid

To a stirred mixture of triethylamine (1.4 ml., 0.01 mole) and 2-phenylthiazole-4-acetic acid (2.19 g., 0.01 mole) in tetrahydrofuran (50 ml.) kept at −10° C. isobutylchloroformate (1.37 g., 0.01 mole) in ether (5 ml.) was added dropwise. After 10 min. this mixture was added to a stirred suspension of 6-aminopenicillanic acid (2.16 g., 0.01 mole) and triethylamine (4.2 ml., 0.03 mole) in methylene chloride at 0° C. The mixture was stirred for 2 hours while the temperature was allowed to rise to 23° C., and then poured into ice water. The pH was adjusted to 2.5 and the product extracted with ethyl acetate. After drying the organic phase the penicillin was precipitated as its potassium salt by addition of potassium 2-ethylhexanoate. IR-absorption at 1760 cm.$^{-1}$ (β-lactam C=O), purity 98%, MIC against *Staph. aureus*, Oxford 0.03 mcg./ml. and against *Streptoc. pyogenes* ≤0.006 mcg./ml.

EXAMPLE 4

6-(4-thiazolylcarboxamido)penicillanic acid

To an ice cooled stirred solution of tributyltin 6-aminopenicillinate (21.1 g., 0.042 mole) and triethylamine (15.5 ml., 0.11 mole) in dimethylformamide (200 ml.) thiazolyl-4-carbonylchloride hydrochloride (9.2 g., 0.05 mole) in dimethylformamide (100 ml.) was added dropwise. After 15 hours at +4° C. ethyl acetate (400 ml.) was added and the mixture was filtered. The filtrate was poured into 600 ml. of ice water and the pH adjusted to 6.5. The organic layer was washed with water, dried and evaporated in vacuo. The residue was dissolved in dimethylformamide (30 ml.) and charcoaled. Then potassium thiophenoxide (5 g., 0.034 mole) was added. After 30 min. the solution was poured into acetone (250 ml.) and the product collected by filtration. IR-absorption at 1760 cm.$^{-1}$ ($\beta$-lactam C=O), purity 68%, MIC against *Staph. aureus*, Oxford 1.25 mcg./ml.

What we claim is:

1. A compound selected from the group consisting of those having the formula $$R-CH_2-CO-NH-CH-CH \overset{S}{\underset{CO-N}{\diagup}} \overset{CH_3}{\underset{CH-COOH}{\diagdown}} C-CH_3$$

wherein R is selected from the group consisting of

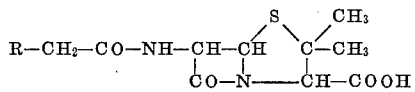

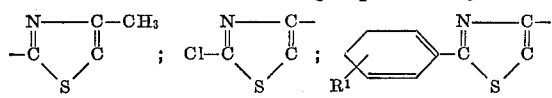

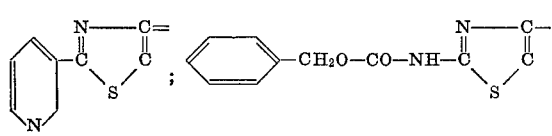

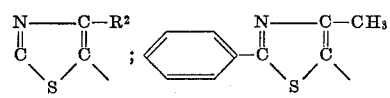

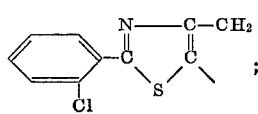

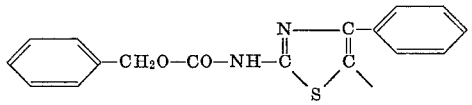

wherein $R^1$ is hydrogen, lower alkyl or halogen; wherein $R^2$ is hydrogen, lower alkyl or phenyl; and therapeutically acceptable, non-toxic salts thereof.

2. A compound selected from the group consisting of 6-[α-(2-chlorothiazole-4)acetamido] penicillanic acid and a therapeutically acceptable, non-toxic salt thereof.

3. A compound selected from the group consisting of 6-[α-(2-phenylthiazole-4)acetamido]penicillanic acid and a therapeutically acceptable, non-toxic salt thereof.

4. A compound selected from the group consisting of 6-[α-(thiazole-5)acetamido]penicillanic acid and a therapeutically acceptable, non-toxic salt thereof.

5. A compound selected from the group consisting of 6-[α-(4-phenylthiazole-5)acetamido]penicillanic acid and a therapeutically acceptable, non-toxic salt thereof.

6. A compound selected from the group consisting of 6-[α - (2 - phenyl-4-methylthiazole-5)acetamido]penicillanic acid and a therapeutically acceptable, non-toxic salt thereof.

7. A compound selected from the group consisting of 6-[α - (2-o-chlorophenyl-4-methylthiazole - 5)acetamido] penicillanic acid and a therapeutically acceptable, non-toxic salt thereof.

References Cited

UNITED STATES PATENTS

| | | | |
|---|---|---|---|
| 3,271,407 | 9/1966 | Raap et al. | 260—239.1 |
| 3,296,250 | 1/1967 | Fraser | 260—239.1 |

NICHOLAS S. RIZZO, Primary Examiner

U.S. Cl. X.R.

260—999

UNITED STATES PATENT OFFICE
CERTIFICATE OF CORRECTION

Patent No. 3,574,799          Dated April 13, 1971

Inventor(s) PETER BAMBERG et al

It is certified that error appears in the above-identified patent and that said Letters Patent are hereby corrected as shown below:

Col. 1, line 47, "carbons" should be -- carbon atoms --;

Col. 2, line 8, "chlorophenyl-4" should be

-- chlorophenyl-4- --;

Col. 2, lines 45 and 46 reads:

"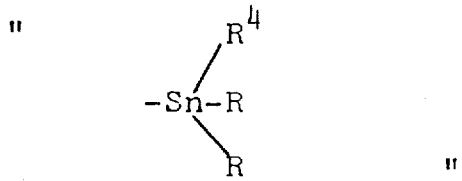"

should read:

-- 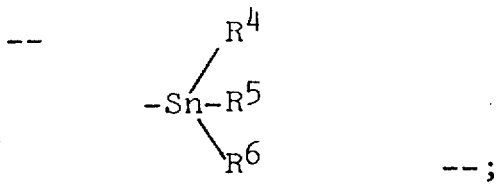 --;

Col. 3, line 22, reads "6[ " should read -- 6-[ --

Col. 4, line 29 reads "benzenesulponic" should read

-- benzenesulphonic --

Col. 5, line 34 reads "N-C-CH$_2$" should read -- N-C-CH$_3$ --

Signed and sealed this 7th day of September 1971.

(SEAL)
Attest:

EDWARD M. FLETCHER, JR.          ROBERT GOTTSCHALK